United States Patent
Keil et al.

(10) Patent No.: US 10,317,309 B2
(45) Date of Patent: *Jun. 11, 2019

(54) TEST DISC, TEST SYSTEM AND METHOD FOR TESTING THE SEAL OF A GLOVE WHICH IS INSTALLED IN A PORT OF AN ISOLATOR, A GLOVE AND AN ISOLATOR FOR USE WITH THE TEST SYSTEM

(71) Applicant: Michael Keil, Mücke-Merlau (DE)

(72) Inventors: Christopher Keil, Mücke-Merlau (DE); Michael Keil, Mücke-Merlau (DE)

(73) Assignee: Michael Keil, Mücke-Merlau (DE)

( * ) Notice: Subject to any disclaimer, the term of this patent is extended or adjusted under 35 U.S.C. 154(b) by 83 days.

This patent is subject to a terminal disclaimer.

(21) Appl. No.: 15/586,028

(22) Filed: May 3, 2017

(65) Prior Publication Data

US 2017/0234760 A1 Aug. 17, 2017

Related U.S. Application Data

(60) Division of application No. 14/663,229, filed on Mar. 19, 2015, now abandoned, which is a continuation of
(Continued)

(30) Foreign Application Priority Data

Dec. 7, 2012 (EP) .................................... 12196195

(51) Int. Cl.
*G01M 3/02* (2006.01)
*G01M 3/32* (2006.01)
(Continued)

(52) U.S. Cl.
CPC ........... *G01M 3/3218* (2013.01); *B25J 21/02* (2013.01); *G01M 3/027* (2013.01); *G21F 7/053* (2013.01)

(58) Field of Classification Search
CPC .... G01M 3/027; G01M 3/187; G01M 3/3218; G01M 3/3263; B25J 21/02
See application file for complete search history.

(56) References Cited

U.S. PATENT DOCUMENTS 5,578,747 A * 11/1996 Nottingham .......... G01M 3/227
73/40
6,810,715 B2 * 11/2004 Castro ................. G01M 3/3218
73/37

(Continued)

FOREIGN PATENT DOCUMENTS

CN 202049026 U 11/2011
DE 20115261 U1 2/2002
(Continued)

OTHER PUBLICATIONS

Machine translation of DE 10145597.*
(Continued)

*Primary Examiner* — Natalie Huls
(74) *Attorney, Agent, or Firm* — SoCal IP Law Group LLP; Guy Cumberbatch

(57) ABSTRACT

A test system and a corresponding method for testing the seal of a glove which is installed in a port of an isolator, including a test disc which can be connected in a hermetically sealed fashion to the port. The glove and test disc define a sealed glove volume which can be placed under excess pressure. The test disc has a pressure-measuring device with a microprocessor and a memory for recording and storing a pressure profile in the glove volume and a data interface. The glove and port have identification elements which are read by a reading device of the test disc and information concerning the pressure profile along with the identities of the glove and port are transmitted wirelessly to an evaluation unit which estimates and records a residual
(Continued)

Direction of expansion period of use of the glove. A plurality of gloves in ports can be tested simultaneously.

10 Claims, 5 Drawing Sheets

Related U.S. Application Data application No. PCT/EP2013/074420, filed on Nov. 21, 2013.

(51) Int. Cl.
  *B25J 21/02* (2006.01)
  *G21F 7/053* (2006.01)

(56) References Cited

U.S. PATENT DOCUMENTS

| | | | | |
|---|---|---|---|---|
| 7,174,772 | B2* | 2/2007 | Sacca | G01M 3/3218 73/49.2 |
| 9,589,689 | B2* | 3/2017 | Fournier | B25J 21/02 |
| 2011/0000282 | A1* | 1/2011 | Cournoyer | G01M 3/3263 73/40 |
| 2011/0100095 | A1* | 5/2011 | Cournoyer | G01M 3/3263 73/40 |
| 2012/0305647 | A1 | 12/2012 | Lantheaume et al. | |
| 2013/0111647 | A1 | 5/2013 | Keil et al. | |
| 2017/0219457 | A1* | 8/2017 | Keil | G01M 3/3209 |

FOREIGN PATENT DOCUMENTS

| | | |
|---|---|---|
| DE | 10145597 | 4/2003 |
| DE | 102004030766 A1 | 7/2005 |
| DE | 10 2010 031 204 A1 | 1/2012 |
| EP | 12196195.7 | 12/2012 |
| WO | 2014086591 A1 | 6/2014 |

OTHER PUBLICATIONS

Machine translation of DE 102004030766.*
State Intellectual Property Office of People's Republic of China, The Second Office Action for Application No. 201380063453.2, dated Apr. 4, 2018.
European Patent Office, International Search Report for Application No. PCT/US2013/074420, dated Mar. 24, 2014.
Skan AG: "WirelessGT—The innovative glove leak testing system", Sep. 17, 2012. (XP055175441).
European Patent Office, Office Action for German Application No. 12 196 195.7, dated Mar. 18, 2015.

* cited by examiner

→ Direction of expansion

TEST DISC, TEST SYSTEM AND METHOD FOR TESTING THE SEAL OF A GLOVE WHICH IS INSTALLED IN A PORT OF AN ISOLATOR, A GLOVE AND AN ISOLATOR FOR USE WITH THE TEST SYSTEM

CROSS-REFERENCE TO RELATED APPLICATIONS

This application is a divisional of U.S. application Ser. No. 14/663,229 filed on Mar. 19, 15, which claims the benefit of priority under 35 U.S.C. § 365(c) and § 120 as a continuation of PCT/EP2013/074420 filed on Nov. 21, 2013, which claims the benefit of priority to European Patent Application No.: EP 121 961 95.7 filed Dec. 7, 2012. The full contents of the International Application are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

FIELD OF THE INVENTION

The disclosure relates to a test disc and to a test system having a test disc for testing the seal of gloves which are installed in ports of an isolator. The glove forms with the isolator a region which is separated spatially from the surroundings, and a test system which comprises a multiplicity of test discs and a method for comprehensive evaluation of the acquired data and their use serve to increase the safety, reliability and productivity of systems with such regions.

BACKGROUND OF THE INVENTION

Isolators are used in various industrial fields, for example in the chemical, pharmaceutical and nuclear industries but also in medicine in order to produce a volume which is separated from the surroundings and in which selected substances can be stored and manipulated, for example subjected to chemical reaction, wherein the transportation of material is prevented in (at least) one direction (from the isolator to the surroundings or else from the surroundings to the isolator). For instance, isolators used in the nuclear industry may be referred to as glove boxes, wherein a technician may reach into the box using a sealed glove to manipulate the contents therein without the atmosphere/material within the box leaking.

The prevention of the transportation of material from the isolator into the surroundings is necessary, for example, if radio-active substances or powderous chemicals are stored and handled in the isolator. Isolators in the nuclear field (i.e., glove boxes) are operated here under a high underpressure in order to prevent radio-active substances from escaping into the surroundings under all circumstances. On the other hand, in the case of chemicals a low underpressure compared to the atmospheric pressure is sufficient.

In contrast, a transportation of material from the surroundings into the isolator must be prevented, in particular in the case of isolators for aseptic pharmaceutical processes, in order to avoid contamination of the isolator volume or interior with germs from the surroundings. A relatively low excess pressure compared to the atmospheric pressure is already sufficient for this.

Handling of the substances in the isolator is preferably carried out in both cases using remote-controlled mechanical manipulators. However, there are a multiplicity of processes in which such automation is not possible, or is possible only at unacceptably high cost, with the result that it is not possible to dispense with human beings as the operator. The access of the operator to the interior of the isolator is carried out here by means of breakthroughs in the wall of the isolator, referred to as ports, which are equipped with flexible gloves which are clamped in a hermetically sealed fashion and are composed of a sufficiently resistant material. The gloves can, on the one hand, ensure the seal (integrity) of the isolator volume, but on the other hand they can also give the operator the necessary freedom of movement in order to carry out the necessary manipulations in the interior.

Any disruption of the integrity of the isolator entails economic or even health risks. If, for example, germs penetrate the isolator from the surroundings, an entire batch of aseptically manufactured pharmaceutical products may become unusable. If, in the inverse case, toxic substances escape from the isolator, they can endanger the operator and the surroundings. For this reason, such disruptions must be prevented in all cases and if they nevertheless occur despite all counter-measures, they must be detected and eliminated immediately.

Internationally recognized prescriptions such as, for example, the Guideline "Guidance for Industry—Sterile Drug Products Produced by Aseptic Processing—Current Good Manufacturing Practice" of the U.S. Food and Drug Administration (FDA), which is addressed specifically to the pharmaceutical industry and was updated in 2004, therefore recommends implementation of a comprehensive preventive maintenance programme. Gloves, seals, sealing means and also transfer systems should be subjected to daily testing. In addition, the actual period of use of all the critical components should be carefully logged in writing in order to ensure prompt replacement before the expiry of the permissible period of use.

The FDA Guideline pays particular attention to gloves. Damaged gloves or sleeves form contamination channels and constitute a critical breach of the integrity of the isolator. A preventive maintenance programme is recommended, said maintenance programme already starting with the selection of a particularly durable glove material and a data-based definition of the times of replacement of the glove. Whenever the gloves are used, they should be inspected visually for macroscopic defects. Physical integrity tests should be carried out routinely. The monitoring and maintenance programme should identify any glove with compromised integrity and initiate its replacement.

The FDA Guideline refers to the risk of a microbial migration through microscopic holes in gloves and to the lack of highly sensitive integrity tests for gloves and therefore recommends careful hygienic handling of the interior of the glove and the additional wearing of thin disposable gloves by the operator.

Within the territory of the EU, comparable regulations apply which were updated in 2008 and which are laid down in a German translation in the "Anhang 1 zum EG-Leitfaden der Guten Herstellungspraxis—Herstellung sterile Arzneimittel" [Annex 1 to the EC Guideline for Good Manufacturing Practice—Manufacturer of Sterile Medicines]. However, the recommendations contained therein regarding isolators do not go beyond the prescriptions of the FDA Guideline, and the latter can therefore be considered to be a generally valid standard.

Prior Art

In order to meet the prescriptions of the FDA Guideline, a multiplicity of measures (handling instructions, measurement method and testing methods as well as prescriptions regarding comprehensive documentation) which are to be implemented in combination have already been developed and described in the literature.

However, the known measures have considerable disadvantages:

The working sequences are very complex and require frequent and time-consuming training of personnel who have to be enabled to carry out a multiplicity of manual steps in the predefined sequence with constant quality at all times. The precondition for this are highly motivated employees who act on their own initiative and follow the operating instructions precisely at all times, even when there is no supervision and when deadlines are pressing. Nevertheless, infringements of the regulations due to negligence or unintention are unavoidable.

Many data items with a safety-relevant character, in particular the running period of use and the conditions of use for each individual glove (glove history) are not detected since until now this would have been possible only by means of documentation of a manual kind, which is therefore very time-consuming and susceptible to errors. The safety is instead ensured by shortening the glove-changing intervals.

The previously developed methods for testing the integrity of isolators, in particular of the gloves installed in the glove ports, are very time-consuming and laborious, irrespective of whether the testing is routine testing or unscheduled owing to an incident. In many methods, the gloves must be removed for testing, tested in a test device and then installed again. The high degree of expenditure in terms of time and work during the application of these methods results in a series of further disadvantages: the methods cannot be integrated into ongoing production sequences. When the gloves are removed and installed again, they can be damaged. Damage which only occurs during the reinstallation after the testing, and resulting leaks, cannot be detected. Since the sequence of the gloves is generally not monitored during the removal and reinstallation, it is not readily possible to produce a glove history with these methods.

Although methods which permit testing of gloves in the installed state have already been described, the equipment which has been available for these purposes until now is cumbersome and heavy and accordingly difficult to handle.

For example, DE102004030766A1 describes a computer-supported test system and test method for measuring the seal of gloves which are installed in isolators of pharmaceutical systems, in which system and method a voluminous measurement chamber which covers the isolator port to be tested with the installed glove over a large area is coupled in a gas-tight fashion to the outer wall of the isolator in order to test the integrity. The measurement chamber is equipped with pressure and temperature measuring devices and can optionally be operated with an underpressure or with an excess pressure. The measured values of the pressure and temperature are fed to a central processor unit which evaluates the pressure profile as a function of the time. If the change in pressure during a predefined measuring time is below a defined limiting value, the glove is classified as being sealed. During the testing, the glove cannot be used for manipulations, and the testing is therefore to be carried out outside ongoing operation.

The central processor unit can be connected to a plurality of measurement chambers allowing the simultaneous testing of a plurality of gloves, only of one per chamber. A particular advantage is considered by the applicant to be the pressure measurement directly in the measurement chamber (in contrast to previously known devices where measuring devices which are located at a distance are connected via pressure hoses which are susceptible to faults). The computer-assisted evaluation permits the quantitative determination of leakage rates, and each measurement chamber and each glove are uniquely identifiable.

A first disadvantage of this solution is the use of relatively heavy, large measurement chambers whose own integrity, that is to say the gas-tight coupling to the outer wall of the isolator, has to be firstly ensured at high cost. In addition, as a result of their intrinsic weight they load the isolator wall very unevenly (tensile stress in the upper part, compressive stress in the lower part) and therefore can themselves give rise to integrity problems, particularly leakages in the region of the seals of the isolator port. The time-consuming coupling and uncoupling of the measurement chamber leads also to productivity losses since not only during the measurement but also during these equipping times the port cannot be used for its intended purpose.

A second disadvantage is that although individual identification elements are provided for each measurement chamber and each glove, there is no assignment to the ports. It is therefore not possible to detect and document the position of the individual gloves automatically. In order to be able to trace back the production processes for which a glove is used and to track with which chemicals it has been in contact and for how long, manual documentation would have to be carried out to determine at which isolator ports the glove was installed during its previous period of use, which is impractical. It is therefore virtually impossible to define individually the residual period of use of the glove on the basis of its actual loading with chemicals. Only fixed intervals for the changing of the glove are practical. Even if different, process-dependent periods of use are known for the gloves from reliable experiments, for safety reasons the shortest change interval is always selected, which gives rise to further productivity losses owing to the expenditure of time for the premature changing of a glove and to higher costs for the purchase of gloves.

Solutions are already known which eliminate the first disadvantage of the above solution by replacing the cumbersome measurement chambers which have to be coupled from the outside to the isolator by easy-to-handle, compact test discs which are inserted directly into an isolator port and close it off in a gas-tight fashion by expansion of a sealing element.

Such a test disc is described in U.S. Pat. No. 6,810,715 B2. It comprises a base plate, a cover plate and a sealing device, for example a plate made of neoprene, located between them. A bore in the centre of the three plates accommodates a screw mechanism with which the base plate and cover plate are drawn one toward the other and in the process they press the neoprene plate together, which consequently expands in the radial direction and closes off the port with the installed glove in a gas-tight fashion. Two further bores serve to accommodate a pressure sensor and an inlet valve which is connected to a pressure bottle and/or a pump. The somewhat complicated manufacture of the seal-forming connection of the isolator port and the test disc by manual actuation of the screw mechanism and the production of the excess pressure which is necessary for testing by means of the connection to an external pressure bottle and/or pump are somewhat disadvantageous.

Attempts have been made to address some of these shortcomings, such as DE 10 145 597 A1 and DE 20 115 261 U1, which disclose methods for testing the seal on a working glove and a sealing disc which permit pressure profiles to be measured and stored in a microprocessor, and the values to be read out via an interface.

There remains a need for a more comprehensive method for testing glove seals on isolators which reduces the amount of time and effort involved and increases accuracy to prevent leaks and extend glove life.

SUMMARY OF THE INVENTION

The present application discloses a test disc, a test system and a method for testing the seal of a glove which is installed in a port of an isolator. The application also describes a glove and an isolator for use with the test system.

An object of the invention is to eliminate the disadvantages of the prior art and to make available a test disc, a test system or a method for operating the test system with which a history of process data relating to the glove can be produced and a prediction about an anticipated residual service life of the glove can be made, wherein system safety and process safety are to be improved and a period of use of the glove is to be extended.

In one aspect of the present application, a test disc for testing the seal of a glove which is installed in a particular port of an isolator is provided. The test disc has a seal for connecting to the port in a hermetically sealed fashion, a pressure-measuring device, a microprocessor, a memory and a data interface for transmission of information. The test disc further includes a reading device configured to determine the identity of the particular isolator port. A glove has an open end sized to be sealed between the test disc and port by the seal so as to define an internal glove volume which can be placed under excess pressure. The pressure-measuring device of the test disc is arranged to measure the glove volume pressure, and the microprocessor and memory are configured to record and store a glove volume pressure profile. The glove further has a first identification element which can be read by the reading device of the test disc to determine a glove identity, and the microprocessor being programmed to store both the identity of the glove and the identity of the particular isolator port in the memory.

The test disc seal is preferably a radially-expanding sealing device and the test disc further includes a first micro-air pump connected to the test disc to expand the sealing device. In addition, the test disc may further include a second micro-air pump with a pre-filter connected to the test disc to fill the glove volume. An electrical energy source in the form of an accumulator may be mounted to the test disc. The reading device preferably has a reader selected from the group consisting of: an RFID module, a CCD sensor and a laser sensor. The test disc microprocessor may have a control device for automatically setting a pressure in the glove volume. The test disc data interface desirably has a wireless transmitter such that the glove pressure profile and information regarding the glove and port identities may be transmitted wirelessly to an evaluation unit of an external test system. For example, the wireless transmitter of the data interface is selected from the group consisting of: a WiFi module, an W-LAN module, a Bluetooth module or a radio-based transceiver module.

In accordance with another aspect of the application, a test system has at least one of the test discs as well as an evaluation unit comprising a memory unit and an output unit connected to a user database. The glove pressure profile can be assigned with the identification data precisely to one glove and one port, and the evaluation of a state and/or an estimate of a residual period of use of the glove are/is carried out. The evaluation unit may have a WiFi module, a W-LAN module, a Bluetooth module or some other radio-based transceiver module. The test system enables process-related data about the use of the glove to be stored in the evaluation unit and taken into account during the evaluation. The test system preferably has a multiplicity of test discs for simultaneously testing a plurality of gloves, wherein the test discs communicate with the evaluation unit.

In accordance with a further aspect of the application, a glove for a test system as described above is adapted to be inserted in a hermetically sealed fashion into the port of an isolator, wherein the glove has an identification element for reading out by the reading device of the test system.

A still further aspect is an isolator for the use of the test disc, test system and glove as described above has at least one port into which the glove can be inserted in a hermetically sealed fashion. The test disc may be connected in a sealed fashion to the port, and the isolator has an identification element for each port.

A method for evaluating the seal of a glove having a test disc is also disclosed, and preferably uses the test system as described above. In the method, the pressure profile is detected over a predefined time period and information data about the glove and the port is assigned to the pressure profile. Subsequently, a pressure drop, which is compared with a limiting value, is determined from the pressure profile. Preferably, historical data, in particular process data, is taken into account during the evaluation of the state, wherein in particular a residual period of use of the glove is estimated. Moreover, the pressure profiles for a multiplicity of gloves are desirably received simultaneously from a plurality of test discs and processed, wherein the respective pressure profiles are assigned unambiguously to a corresponding glove and port. Removal of the test disc from the port is prevented if a defect in the glove is detected. In the method, a pressure profile which is recorded for a specific glove at a relatively early point in time is compared with a pressure profile which is recorded for this glove at a relatively late point in time, and this comparison is taken into account for the estimation of a residual period of use.

By providing identification elements on the glove and on the port, the reading device can perform uniquely defined identification not only of the glove but also of the port and can compare corresponding identification data directly with a recorded pressure profile. The identification data of the port then results in a reference to the processes which have expired in the surroundings of the glove, wherein a uniquely defined and traceable assignment is made by means of the identification of the glove. It is therefore possible, for example, to store a history for each glove and to permanently block a glove once it has been detected as faulty. Insertion of the glove at another port is also reliably detected by means of the test disc or by means of the test system.

By means of the test system according to the invention, the data which is acquired, in particular, simultaneously for a plurality of gloves using a multiplicity of the test discs according to the invention can be buffered. This data can be subjected to initial evaluation, where necessary immediate measures can be initiated in the event of a leak being detected, and the data including the results of the initial evaluation can be stored in a database. Manual documentation in order to ensure the traceability as far as the specific port and glove is replaced by automatic solutions, and therefore the efficiency of the human/machine interface is increased and its susceptibility to errors is reduced. As a result, an expanded evaluation method in which the information which is acquired using the totality of test discs and test system is connected to process information of the user in such a way that an increase in the system safety and reliability as well as optimum utilization of the service life of process means, in particular of the gloves, is achieved.

DESCRIPTION OF THE PREFERRED EMBODIMENTS

The present application provides a test system and a corresponding method for testing the seal of a glove which is installed in a port of an isolator, including a test disc which can be connected in a hermetically sealed fashion to the port. Various terms are described below.

The term "region separated spatially from the surroundings" includes any desired designs of what are referred to as isolators and barrier systems (Restricted Area Barrier Systems—RABS) in which the interior is separated completely from the surroundings (in the case of an isolator) or partially (in the case of RABS as half-open systems), and a permanent difference in pressure is maintained between the exterior (surroundings) and the separated interior. This permanent difference in pressure prevents a direct (unfiltered) transportation of material in the direction of the region with the relatively high pressure. Depending on the setting in the difference in pressure, this relates to the transportation of material from the separated region to the surroundings or else from the surroundings to the separated region. In the case of a RABS, the difference in pressure is selected in such a way that a permanent laminar flow (expulsion flow) comes about in the opposing direction. In the case of an isolator, the transportation of material in the opposing direction is also prevented, with the result that the atmosphere in its interior can also experience turbulent movement.

As in the "Annex 1 to the EC Guideline for Good Manufacturing Practice—Manufacturer of Sterile Medicines" updated in 2008, the present application does not differentiate between the isolators and RABS. Instead, the term "isolator" is used as a generic term. Corresponding systems in nuclear technology, usually referred to as glove boxes are also to be subsumed under this.

The walls of the isolator generally have ports in the form of breakthroughs which permit manipulations to be carried out in its interior by an operator located in the exterior. However, the ports must not adversely affect the separation between the interior and the exterior and are therefore usually equipped with impermeable protective gloves which are inserted in a gas-tight fashion and have long sleeves. For manipulations which require a particularly large degree of freedom of movement, the ports can be widened and equipped, for example, with half-suits which are used in a gas-tight fashion. The term "glove" is used as a generic term for such protective gloves and half-suits.

A leak is understood to be a defect in the separation between the interior of the isolator and the exterior, which defect permits a transportation path in the prohibited direction and therefore the entry of material-bound contamination from the surroundings into the interior or from the interior into the surroundings. A leak is also referred to as an infringement of the integrity or seal of the isolator.

Figure 1:
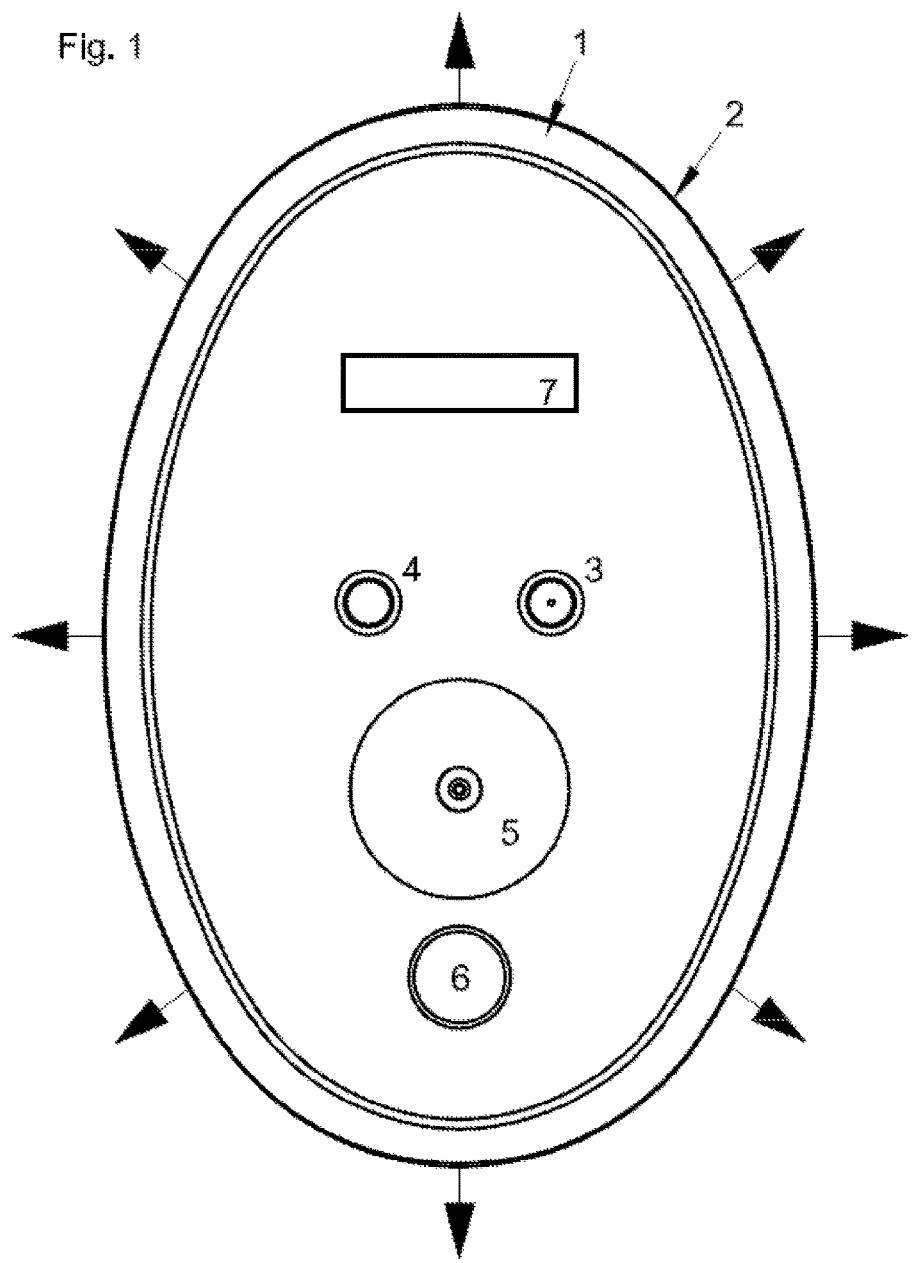
FIG. 1 shows the front view of a test disc which forms a seal from the inside to the outside (i.e. the side facing the exterior)

In the illustrated embodiment, FIG. 1 shows a test disc 1. An on/off switch 3, a start/stop pushbutton key 4, an inflation valve 5 for filling a glove volume, a pre-filter 6 and an LCD display 7 are arranged on a front side of the test disc 1. The test disc is surrounded in a radially circumferential fashion by a sealing device 2 which is embodied as a hose. Inflating the hose causes the latter to expand outward in a direction which is symbolized by arrows. FIG. 1 therefore illustrates a test disc 1 which can be inserted into a breakthrough which forms the port, and forms a seal from the inside to the outside.

Figure 2:
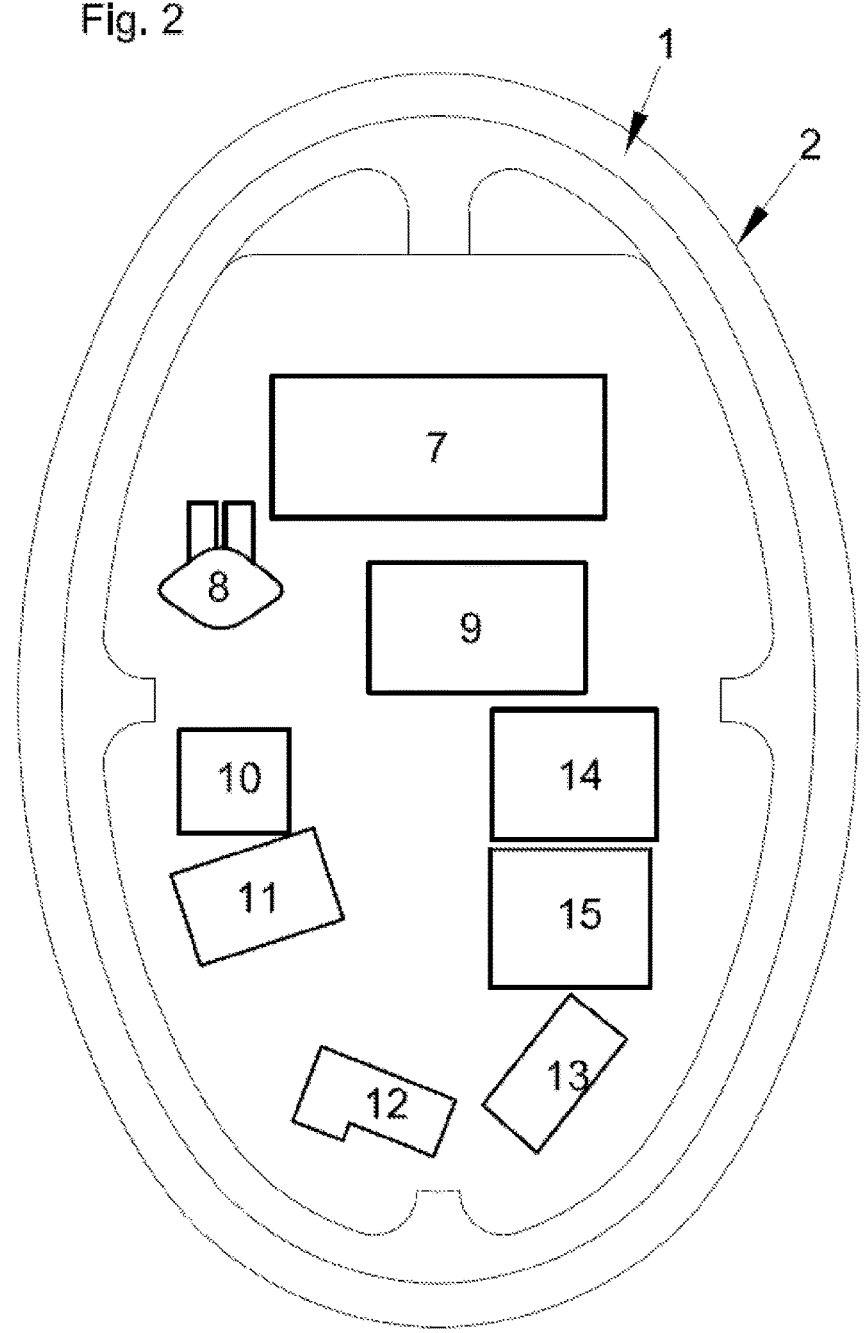
FIG. 2 shows a schematic illustration of the elements arranged in the interior of the test disc.

FIG. 2 shows a schematic internal view of the test disc 1 with the components arranged therein. These include a pressure sensor 8 for detecting a pressure in the glove volume, a pressure measuring device with a microprocessor 9 and a pressure sensor for detecting the pressure in the sealing device 2. In addition, a valve for inflating the sealing device 2 via a first micro-air pump 12 is provided. A second micro-air pump 13 serves to inflate the glove volume. An RFID module 15 is used as a reading device for reading out identification elements of the glove and of the port, wherein an interface with a WiFi module 14 is provided for transmitting data to an evaluation unit. An energy source 16 serves to supply energy to the individual components (FIG. 3b).

Figure 3:
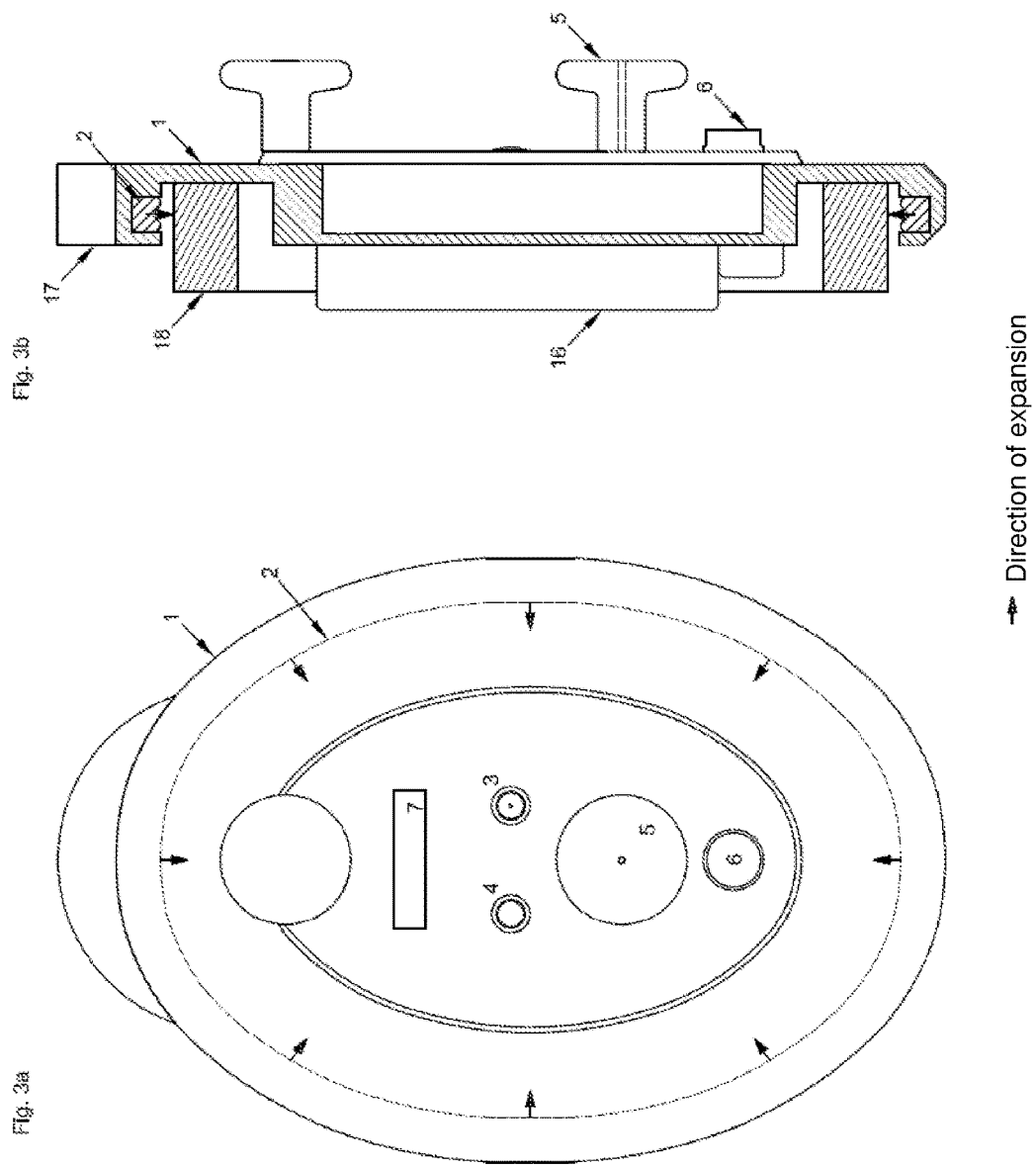
FIG. 3a shows a front view of a test disc which forms a seal from the outside to the inside.
FIG. 3b shows a side view of a test disc which forms a seal from the outside to the inside and which is fitted onto an attachment connector of the port before the sealing element is made to expand.

FIGS. 3a and 3b illustrate an embodiment of the test disc 1' which, in contrast to the embodiment according to FIGS. 1 and 2, is embodied as a test disc which forms a seal from the outside to the inside. Identical components are provided here with the same reference numerals, and corresponding components have a dashed reference numeral.

In contrast to the test disc 1 which forms a seal from the inside to the outside, as illustrated in FIGS. 1 and 2, the test disc 1' which forms a seal from the outside to the inside has an extension in the form of a support ring 17, wherein the sealing device 2' which is formed by a hose is arranged on a radial inner side of the support ring 17. In order to secure the sealing device 2' more firmly, a groove is formed here on the inside. A direction of expansion is symbolized in turn by arrows.

During installation at a port of an isolator, the test disc 1' engages over an attachment connector 18 of the port with the support ring 17. As a result of pressure being applied to the sealing device 2', the latter expands radially inwards and therefore comes to bear from the outside on the attachment connector 18 of the port. This ensures a secure seal.

Otherwise, the design of the test disc 1' which forms a seal from the outside to the inside corresponds to the design of the test disc 1 which forms a seal from the inside to the outside.

Figure 4:
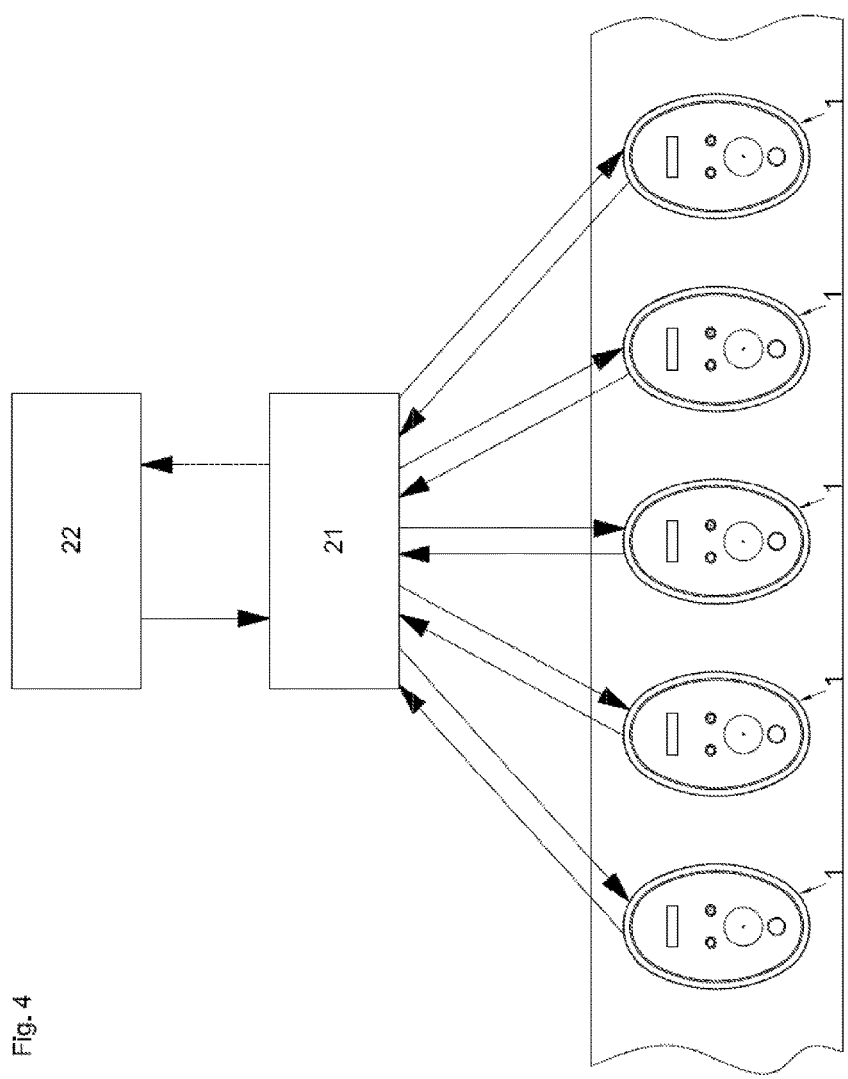
FIG. 4 shows an interaction of an evaluation unit with a multiplicity of test discs and a database of the user.

FIG. 4 illustrates an embodiment of the test system with a multiplicity of test discs 1. The test discs are connected via a wireless connection to an evaluation unit 21 which is embodied as an evaluation computer. The evaluation unit 21 has access here to a database 22 of the user in which, for example, historical data for every glove, material properties and/or process-related data are stored.

Figure 5:
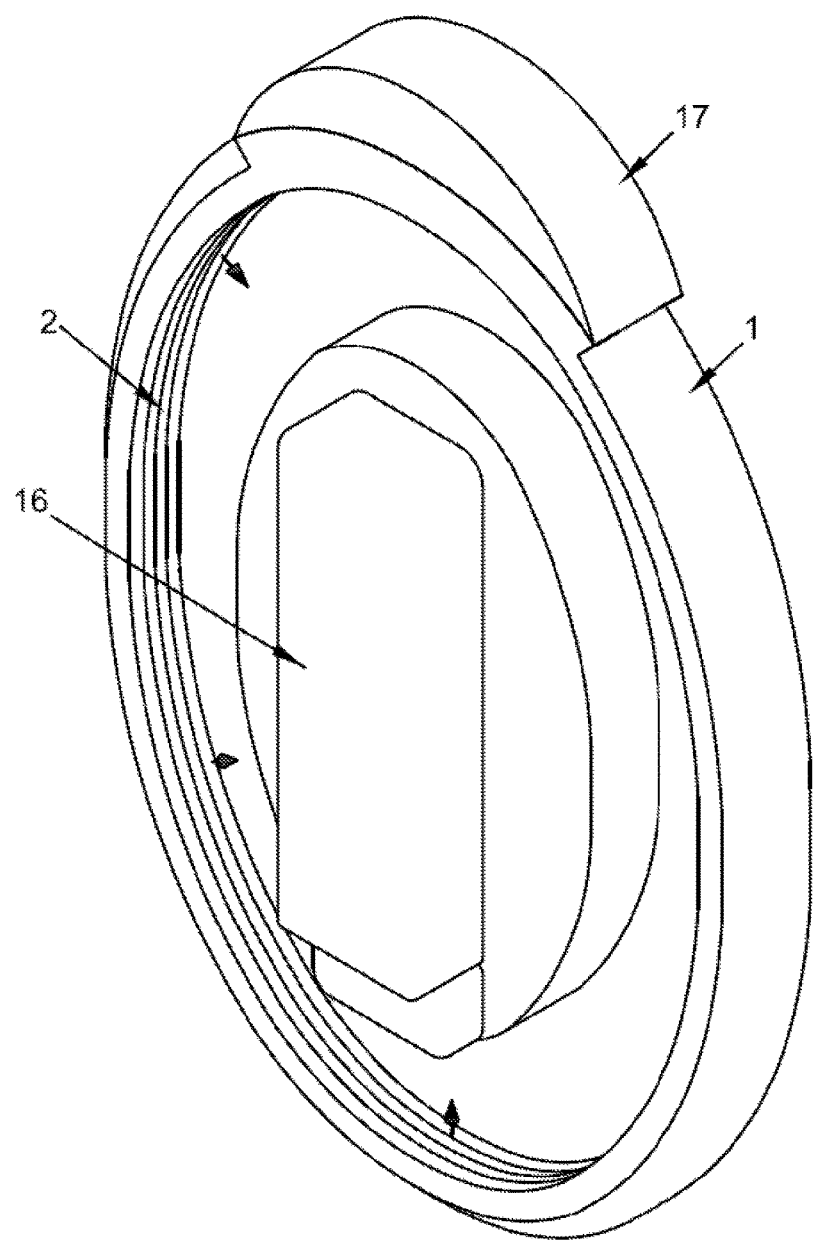
FIG. 5 shows an oblique view of a side, facing the isolator, of the test disc which forms a seal from the outside to the inside.

FIG. 5 shows a spatial illustration of a rear side of the test disc 1'. Here, the energy source 16 which is embodied as an accumulator is arranged centrally on the rear side. As long as the test disc is not installed at a port, simple access or replacement of the energy source is therefore possible.

Exemplary Embodiment 1

A test of the seal of the gloves installed in the ports of the isolator of a pharmaceutical system is to be carried out. The isolator volume is at atmospheric pressure during the test.

In good time before the test it is ensured that all the ports have a uniquely defined identification element. RFID elements are selected as the identification element, said elements being let irreversibly into a bore at the edge of the port without compromising the integrity of the isolator volume. As a result of this one-time marking, the ports can be identified unambiguously during all the tests which occur during their period of use.

In this exemplary embodiment, the gloves can already be equipped by the manufacturer with RFID elements on a standard basis and can therefore also be identified unambiguously.

Other identification elements (barcodes, engraving, impressed numbers) can also be used, but they give rise to increased expenditure during evaluation.

A sufficient number of test discs which are matched to the shape and size of the ports are also made available in good time before the testing. The shape of the ports permits the use of a test disc 1 which forms the seal from the inside to the outside, with the result that this embodiment of the test disc is selected.

The test disc 1 is inserted into the isolator port. In order to activate the test disc, the on/off switch 3 is actuated. Furthermore, the LCD display 7 is switched on with the actuation of the start/stop switch 4, said LCD display 7 transmitting user instructions, fault messages and warning signals to the operator and displaying the state of charge of the energy source 16 and the pressure, measured by the pressure sensor 8, in the volume to be tested. In addition, the micro-air pump 12 is switched on, said micro-air pump 12 inflating the inflatable hose 2 which functions as a seal device and causing it to expand. The expansion device is characterized in FIG. 1 by arrows. The pressure sensor 10 measures the rising pressure in the hose 2 and switches off the micro-air pump 12 when a preset target pressure is reached. The inflated hose closes the port so that the glove and the test disc 1 form a glove volume which is closed off in a gas-tight fashion. The described sealing process lasts approximately 30 seconds. During the entire test, the pressure sensor 10 continuously monitors the pressure in the hose 12 and in the event of a preset minimum pressure being undershot it pumps said hose 12 back again to the target pressure.

The pressure in the glove volume, closed off in a gas-tight fashion, between the test disc and the glove is monitored by the pressure sensor 8 during the entire subsequent test process and is recorded by the microprocessor 9 of the pressure-measuring device.

Before the test process can be started, the compressed air supply present at the isolator is connected to the inflation valve 5, embodied as a handle, for the glove. Alternatively, the handle and inflation valve can also be embodied as stand-alone elements. In this context, the inflation valve can be let in, for example flush with a front side of the test disc. Via the inflation valve 5, the glove volume which is closed off in a gas-tight fashion is firstly subjected to an excess pressure which is below the actual test pressure (initial inflation). If the preset target pressure of the initial inflation is reached, the pressure sensor 8 causes the inflation valve 5 to close and therefore separates it from the outer compressed air supply. For the purpose of fine setting of the preset test pressure, it now brings about the activation of the micro-air pump 13, which supplies the glove volume which is closed off in a gas-tight fashion with contamination-free air which is cleaned by the pre-filter 6. When the precise test pressure is reached, the pressure sensor 8 switches the micro-air pump 13 off. This two-stage inflation process lasts approximately 30-60 seconds.

The inflation pressure can also take place in a single stage, i.e. by means of the exclusive use of the micro-air pump 13, but it would then have to be made more powerful, and the energy source 16 likewise, which is generally not expedient.

After the test pressure is reached, the test process is initiated. The system then firstly waits for a predefined relaxation time in which the glove reacts to the pressure load with a delayed expansion, which leads to a pressure drop which is not due to a leak. The relaxation time is dependent on the glove material.

After the expiry of this stabilization phase, the actual measurement, during which the pressure profile is detected over a time period of, for example, 5 minutes, starts. The measured pressure profile is passed on from the pressure sensor 8 directly to the microprocessor 9. The microprocessor 9 detects that the pressure drop which has occurred during the measurement time, given by the difference between the pressure at the point in time of the starting of the measurement and the pressure at the point in time at the end of the measurement, does not exceed a preset value, with the result that the presence of an acute leak can be ruled out. An alarm signal is therefore not triggered. The RFID module 15 reads out the RFID elements of the port and the glove and signals the information about the identity of the tested port and of the glove installed there to the microprocessor 9, which links this identification data to the measured pressure profile and transmits the complete data record, using the WiFi module 14, to the evaluation unit which is embodied as an evaluation computer 21.

The evaluation computer 21 receives the data record, stores it and checks whether a data record is already present from an earlier test of the same glove. In this exemplary embodiment, said evaluation computer 21 finds such a data record and detects that even though the pressure drop is still within permissible limits, it has significantly speeded up during the new measurement compared to the preceding measurement, which indicates a small local, but continuously growing defect or an accelerated degradation of the glove material. By using the available data records, it predicts the still remaining residual period of use of the glove and transmits it to the microprocessor 9 of the test disc 1. The microprocessor 9 can subsequently cause the test disc to be disabled, in that the relief valve 11 of the sealing device 2 is blocked, a warning signal is triggered and the predicted residual period of use is displayed on the LCD display 7. The operator then has to decide whether to leave the test disc 1, now functioning as the sealing disc, in the port and bring about an immediate change of glove or else to cancel the blocking by switching off the test disc 1 by means of the on/off switch 3, removing the test disc 1 and initially continuing the production process in order to change the glove at the next scheduled interruption in the production process.

The described test process can simultaneously be carried out with any desired number of the test discs according to the invention on a corresponding number of ports which are equipped with gloves.

Exemplary Embodiment 2

A further seal test of the gloves installed in the ports of the isolator of a pharmaceutical system is to be carried out in a way analogous to the task described in the exemplary embodiment 1.

The equipping of the ports and of the gloves with identification elements as described in exemplary embodiment 1 is ensured.

In good time before the test it is determined that the ports have a conically tapering shape, with the result that a test disc 1 which forms a seal from the inside to the outside cannot be reliably secured in the port. However, the outwardly protruding attachment connector 18 of the port is suitable for attaching a test disc. The embodiment 1' of the test disc which forms a seal from the outside to the inside (illustrated in FIGS. 3a and 3b) is therefore selected. The test disc 1' is equipped with an expansion in the form of a support ring 17, the internal dimensions of which are somewhat larger than the external dimensions of the attachment connector 18, with the result that it can be fitted thereon. An inflatable hose 2' which is secured by a groove and which functions as a sealing device is arranged in an inner face of the support ring 17. The hose 2' has a sufficiently rigid sealing material, with the result that even in the non-expanded state it bears firmly against the inner edge of the support ring 17. A sufficient number of test discs which are matched to the shape and size of the port are made available.

The test disc 1' is fitted onto the attachment connector 18 of the isolator port. The following sequence is completely analogous to the sequence in exemplary embodiment 1, with the result that a renewed detailed illustration can be dispensed with. It is merely to be noted that the inflatable hose 2' which functions as a sealing element runs here around the attachment connector 18 of the port and expands from the outside to the inside during inflation, with the result that the glove, port and test disc form a glove volume which is closed off in a gas-tight fashion. The direction of expansion is characterized by arrows in FIGS. 3a, 3b and 5. The pressure profile which is measured in the course of the test and transmitted to the evaluation computer corresponds to the results illustrated in exemplary embodiment 1.

However, in contrast to the situation illustrated in exemplary embodiment 1, the evaluation computer 21 has access here to selected, process-related data in the database 22 of the user, with the result that an expanded evaluation method can be used.

The evaluation computer 21 receives and stores the data record which contains the measured pressure profile and the identification data of the port and of the glove. It tests whether a data record from an earlier test of the same glove is already present. It finds such a data record and determines that the pressure drop during the new measurement is within the permissible limits and has not speeded up compared to the preceding measurement. The test therefore does not provide any indication at all of the defect or of already present degradation of the glove material, with the result that the glove appears to be capable of being used without restriction on the basis of the data used here.

Within the scope of the extended evaluation method, the evaluation computer now extracts the entire previous loading of the glove (type, duration and concentration of the acting chemicals) from the process data of the user and calculates the current state of degradation of the glove using the data relating to the resistance of the glove material compared to the chemicals used, said data being also present with the user. The evaluation computer detects that speeded up degradation of the glove has already started owing to the previous chemical loading, even though said degradation cannot yet be proved by the test. As in exemplary embodiment 1, the evaluation computer predicts the still remaining residual period of use of the glove and transmits this to the microprocessor 9 of the test disc 1'. The microprocessor then brings about the measures described in exemplary embodiment 1, to which measures the operator has to react as described there.

It is therefore ensured that the glove is changed in good time, but not unnecessarily early.

The extended evaluation method can also be carried out simultaneously with any desired number of test discs at a corresponding number of ports equipped with gloves.

The data flow between the individual test discs, the evaluation computer 21 and the database 22 of the user is illustrated in FIG. 4. In FIG. 4, the test system has a multiplicity of test discs according to the embodiment 1 illustrated in FIGS. 1 and 2. However, the test discs can also be formed by test discs according to the embodiment 1' or by a combination of the two embodiments.

The following sections describe preferred characteristics of various components of the test system described herein.

Test Disc

The test disc according to the invention is distinguished in comparison with the test discs which are known from the prior art by the fact that, in addition to already known components, it has a reading device for reading out identification elements and an interface for wireless and encrypted communication with an evaluation device. In this context, the reading out of a plurality of identification elements, that is to say that of the glove and that of the port is possible in succession or in parallel. The individual components are preferably integrated into the interior of the test disc. The device for reading out identification elements may be, for example, an RFID module, a CCD sensor or a laser sensor, while the interface for wireless and encrypted communication can be formed by a WiFi module, W-LAN module, Bluetooth module or some other radio-based solution.

The components which are known from the prior art and are sufficient for the functioning of the test disc comprise an expandable sealing device, two micro-air pumps, a pressure sensor and a temperature sensor, which are preferably arranged in the interior of the test disc. In addition, a compressed air port and an energy source, arranged on the outside of the test disc, are usually provided, the compressed air supply being located on the front side, while the energy source, which supplies all the components of the test disc with electrical energy, is preferably located on the rear side of the test disc facing the glove volume. In one preferred embodiment, a display with an outwardly visible display area, for example an LCD display which supplies the operator directly with information on the current state of the test disc and on the ongoing test process, is contained in the interior of the test disc. The test disc can be additionally equipped with an LED display, by means of which the state of the glove which is defined during the test can be directly displayed.

This energy source, preferably an accumulator, and the arrangement of the pressure sensor and of the module for the purpose of wireless communication in the interior of the test disc permit their completely autonomous operation without coupling to remote measuring devices or a remote energy supply.

Without changing the method of functioning of the test disc, its shape and size can be varied over a wide range. This variability is necessary to allow for the large variety of isolator ports used in practice.

The test disc is preferably embodied as a test disc which seals from the inside to the outside and which can be somewhat smaller than the port to be tested, and can therefore be inserted therein. The seal-forming connection is produced in this case by causing a sealing device which runs around the outer edge of the test disc to expand radially, with the result that it closes the gap between the port and the test disc. This can be done, for example, by applying pressure using the micro-air pump which is arranged on the test disc.

In certain cases, for example in the case of conically tapering ports, stable securement of a test disc in the port is, however, not possible. In this case, the test disc is embodied as a test disc which seals from the outside to the inside, with a widened portion in the form of a support ring which encloses the attachment connector of the port on the outside. The support ring can be embodied here in one piece with the test disc and surrounds a receptacle space for the port. A circumferential sealing device, which is located radially on the inside of the support ring and can be expanded towards the inside, ensures that the gap between the test disc and the attachment connector is closed. The shape of the support ring is matched here to the geometry of the port, that is to say it is not necessarily circular but rather, for example, also oval. Other shapes with a closed circumference are also possible.

In both embodiments of the test disc, the expandable sealing device is preferably embodied as an inflatable hose which is, in particular, of annular design.

Both embodiments of the test disc are explained in more detail in the exemplary embodiments.

Compared to conventional test devices, described for example in DE102004030766A1, the test disc according to the invention for testing gloves installed in isolator ports is small, lightweight, easy to handle and simple to install. During the use of the test disc, only a uniform pressure is applied to the edge of the respective port but the isolator wall is only slightly loaded, with the result that the test discs cannot themselves cause breaches of integrity (leaks). During their handling, no heavy physical work at all has to be carried out. The test discs can easily be transported from one location to another, under certain circumstances even without a service vehicle which is provided for this purpose, and they can therefore be used in an extremely flexible way.

Both scheduled and unscheduled testing, due to an incident, can be carried out quickly at any time.

The testing of the seal of a glove occurs, for example, as follows:

The test disc is installed at the isolator port and the sealing element is made to expand, with the result that the port is closed and the glove and the test disc form a glove volume which is closed off in a gas-tight fashion.

This volume is then subjected to a defined excess pressure (compared to the pressure prevailing in the interior of the isolator). For this purpose, coarse setting of the excess pressure (initial filling) is firstly carried out using an external supply, present on a standard basis on pharmaceutical systems, of contamination-free compressed air, and fine setting of the excess pressure is subsequently ensured by means of the micro-air pump which is provided for this purpose on the test disc and which feeds in contamination-free air which has been cleaned by a pre-filter. The production of a connection (compressed air hose line) to remote compressed air sources, for example pressure bottles, is not necessary then. The pressure sensor monitors the build-up of pressure and switches the micro-air pump off when the target pressure has been reached.

Since the glove materials react to the pressure loading with delayed expansion, the system first awaits for a predefined relaxation time, during which an expansion-induced drop in pressure, which cannot be traced back to a leak, is observed. Since different glove materials exhibit a different relaxation behaviour, the expedient duration of this relaxation time should be determined experimentally in advance.

After the expiry of this relaxation time (stabilization phase), the actual measurement begins, during which measurement the pressure profile is detected over a predefined time period. The measured pressure profile is passed on by the pressure sensor directly to the microprocessor of the pressure measuring device. The microprocessor also receives the information about the identity of the tested port and of the glove installed there from the reading device for reading out identification elements, preferably an RFID module. Said microprocessor links this identification data to the measured pressure profile and transmits the entire data record to an evaluation unit, for example an evaluation computer, by means of the interface for wireless and encrypted communication, preferably a WiFi module.

The precondition for this is the equipment both of the port and of the glove with a uniquely defined identification element. The combined use of identification elements for the glove and port is a significant component of the invention.

It is particularly advantageous if the reading device and the identification elements permit radio-based reading out. Identification elements which can be irreversibly connected to the ports or the gloves and which are suitable for this are commercially available.

Test System

The described test process can be carried out simultaneously with any desired number of the test discs according to the invention on a corresponding number of ports which are equipped with gloves. In this context, a flexible and autonomous test system which is available at any time and with which simultaneous testing of a seal of a plurality of gloves is possible can be obtained by means of a (preferably wireless) connection of the test discs (any desired number thereof, but at least one) to a single central evaluation computer.

Owing to the autonomy of the individual test discs (no coupling of external energy sources, measuring devices or communication means), the equipping times which are necessary for preparing and subsequent processing of the test are very short.

Compared to known test systems, in which an evaluation computer is connected to a plurality of measurement chambers, which, however, do not have, or only partially have, the autonomy features specified in the preceding paragraph, the test system which is based on the test discs according to the invention permits a significant shortening of the overall duration of the test. Correspondingly, the time which is available for the actual production processes is lengthened, which gives rise to a considerable increase in productivity.

The evaluation computer or the evaluation unit has the known components which are essential for the functional capability: a receiver unit, a control unit, an evaluation unit, a memory unit and an output unit. It is particularly advantageous if it has a connection to the database of the user and therefore can also access selected process-related data (for example type of the chemicals used in an isolator and duration of their use).

In one preferred embodiment of the test system, the measurement results (pressure profiles), the test results which are obtained in the subsequently described evaluation method and the associated identification data of the glove and of the port are presented visually on a display of the evaluation unit. As a result, relatively simple and fast identification and determination of the location of the test discs is ensured, with the result that the measurement and test results of the individual ports and gloves can also be assigned easily, quickly and unambiguously.

If the test discs of the test system have a display as a preferred feature, the measurement and test results of each glove which is installed on a port can also be displayed on the display of the test disc which is inserted at the respective port and, if said test disc is equipped with an additional LED, are additionally displayed by the lighting up of a specific LED or a combination of LEDs. A successful test of a seal can therefore be indicated by the lighting up of a green LED, and an unsuccessful test of a seal can, in contrast, be indicated by the lighting up of a red LED on the respective test disc. Further states which are determined as a result of the expanded evaluation method described below can also be displayed. For example, a seal test which has been successful, but during which accelerated degradation of the glove material was detected, can be indicated by the lighting up of a yellow LED. This visual indication by means of an LED display provides the operator with a rapid and direct overview of the state of all the ports and gloves of the monitored production systems without the operator having to evaluate the quantitative measurement and test results which are displayed on the display.

In a further preferred embodiment, the test system is equipped with a device for user authentication, in order to prevent unauthorized operation. Both the evaluation computer and the test discs are not released for use until the operator has been authenticated. Only then can the seal test described above be initiated. For the purpose of authentication, electronic key systems, fingerprint sensors, iris recognition means, safety codes which have to be input and other means can be used.

Evaluation Method

The evaluation unit or the evaluation computer receives the data (pressure profiles) which have been acquired by any desired number of test discs (in a serial or parallel fashion), stores them and prepares them immediately (while the measurement is still ongoing). If the evaluation computer detects here an irregularity (in particular an excessively rapid pressure drop) which indicates a breach of integrity by a faulty glove (acute leak), it immediately transmits a signal, with the result that the operator is immediately informed of the breach of integrity and of the need for immediate counter-measures. In addition, there is the possibility of automatically disabling the expanded sealing element of the affected test disc with the result that the test disc cannot be removed after the conclusion of the measurement. The test disc therefore functions as a sealing disc and ensures the integrity of the isolator until the detected breach of integrity is eliminated.

In one particular embodiment which is suitable for applications with very high safety requirements, the microprocessor of the test disc already analyses the pressure profile and, in the event of an excessively rapid pressure drop being detected, which indicates an acute leak, triggers the reactions specified in the preceding paragraph. In this case, the breach of integrity therefore is detected even if the connection between the test discs and the evaluation computer fails. Owing to the high level of reliability of the connection between the test discs and the evaluation computer, which is implemented in a wireless fashion by means of W-LAN technology, WiFi technology, Bluetooth technology or some other radio-based technology, this embodiment is not used so frequently.

All the test results (pressure profiles, identification numbers and test parameters), the results of both the scheduled tests and of the unscheduled tests owing to an incident are stored in the memory unit of the evaluation computer and can be called again at any time. Since they also include uniquely defined identification data of the port and of the glove, it is possible to track at any point in time the port at which they have been obtained, and for which glove. By comparing the results of two successive routine tests of the same glove, the evaluation computer determines whether the state thereof has changed within the limits of the expected use or whether an accelerated degradation has occurred which makes additional measures such as, for example, shortening of the test interval or premature replacement of the glove necessary. The profile of the degradation of each individual glove is therefore detected completely. If the evaluation computer detects such an accelerated degradation which requires real-time replacement of the glove, the evaluation computer immediately transmits a message to the associated test disc. A warning signal then appears at this test disc so that the operator is immediately informed about the irregularity. In addition, there is the possibility of automatically disabling the expanded sealing element of the affected test disc with the result that the test disc cannot be removed after the conclusion of the measurement and the integrity of the isolator is ensured until further notice. However, since it is not a case of an acute leak here but rather of gradual worsening, the operator can decide whether he initiates counter-measures immediately or postpones them until the next scheduled interruption in production. In contrast to the acute leak, he can, if appropriate, release the test disc again here and remove it in order to continue the production over a limited time period. In order to assist the operator in his decision, the evaluation computer predicts, on the basis of the results of the last successive routine tests, the expected development of the leakage rate of the glove and determines its permissible residual period of use, which is communicated to the operator. The evaluation method therefore evaluates the seal of the glove not only qualitatively (decision between sealed and leaking) but also quantitatively.

An accelerated degradation can have various causes: it can be brought about by a very small local defect which is caused without being noticed by the operator and which develops gradually into a relatively large defect, but it can also be due to a degradation in the glove material as a whole. It is desirable to cause the glove to be exchanged before such degradation can be measured, but without unnecessarily shortening the period of use of the glove.

Local defects which are caused without being noticed cannot be predicted, but the degradation of the glove material as a whole can be predicted if all the damaging influences which act during the period of use of the glove are known quantitatively, for example a duration of effect and concentration of a particularly aggressive chemical. In addition, the reaction of the glove material on this chemical must be known.

Known test systems do not provide any possibilities for this, or only provide restricted possibilities, since the gloves are removed for the tests, wherein the ports at which they were installed in the course of their period of use is not detected. It would therefore certainly not be possible to track what influences they were subjected to.

However, equipping all the gloves and ports with unique identification elements makes it possible to extend the evaluation method by utilizing the access to selected process-related data of the user, in such a way that said method detects the entire life cycle of each individual glove, i.e. the profile of its degradation including the causes thereof.

The extended evaluation method includes linking the data supplied by the test discs according to the invention to further process-related data detected by the user (for example a type and duration of the production process which is carried out, chemicals used, number of the production system). Furthermore, data on the resistance of the glove materials used compared to the chemicals used in the production processes could also be included. This data can be included in the safety data sheets of the chemicals or can be determined experimentally by the user.

This data combination permits new quality in process safety which meets all the prescriptions of the FDA Guidelines and goes beyond them. The individualization of the gloves and ports and the automatic collection of data eliminate errors completely during the manual documentation and during the equipment of the ports with gloves. It is therefore ensured that a glove made of the material provided for it with the prescribed thickness is used for each production step. The combination of the test results, material data and process data makes it possible to know the state of any individual glove at any point in time, i.e. to produce a complete glove history which detects its conditions of use, in particular the chemical loading, and the profile of its degradation over its entire period of use. As a result, each individual glove can be used until its individual period of use expires, without endangering the integrity of the isolator and therefore the safety of the system through inadmissibly degraded gloves.

The access to the process data of the user which is necessary for the extended evaluation method can be implemented in different ways:

The evaluation unit or the evaluation computer of the test system can receive, for example, access rights to selected data of the user which is necessary for the evaluation described above. The evaluation takes place in this case by means of the evaluation unit of the test system. The results are then transmitted to the database of the user and stored there, so that they can be available to the user at any time. The transmission of data can be limited to specific conditioned data, for example the quantitative evaluation of the seal of a glove, but substantially less comprehensive data, for example, complete pressure profiles, can also be transmitted.

Alternatively, the test system can be configured as a system-integrated solution and can be incorporated completely into the process sequences of the user. In this case, the test results (pressure profiles) are not stored by the evaluation computer of the test system but instead transmitted directly into the database of the user, which database is correspondingly adapted for this purpose. The evaluation then takes place on the system of the user.

For a person skilled in the art it is obvious that the possibilities of use of the test discs or of the test system according to the invention with one or more test discs and of the evaluation method are not restricted to pharmaceutical systems. Of course, applications in isolators in the medical field, which isolators are operated with excess pressure or underpressure depending on the application, as well as in glove boxes in the nuclear field, which are operated with a high underpressure, and in all other systems (both excess pressure systems and underpressure systems), which have to ensure a high degree of tightness owing to their function, are possible. By using a plurality of test discs it is possible here to test a plurality of gloves simultaneously.

LIST OF REFERENCE NUMERALS

1 Test disc (forming a seal from the inside to the outside)
1' Test disc (forming a seal from the outside to the inside)
2 Sealing device for 1, embodied as an inflatable hose
2' Sealing device for 1', embodied as an inflatable hose
3 On/Off switch
4 Start/Stop pushbutton key
5 Inflation valve for glove
6 Pre-filter
7 LCD display
8 Pressure sensor
9 Microprocessor
10 Pressure sensor for seal
11 Valve
12 Micro-air pump
13 Micro-air pump
14 WiFi module
15 RFID module
16 Energy source
17 Support ring
18 Attachment connector of the port
21 Evaluation computer
22 Database of the user Of course, with the exception of the sealing device, the positions of the elements of the test disc which are illustrated in the drawings are not compulsorily prescribed. Likewise, the shape and size of the test disc are not prescribed either. In addition to the oval shapes, round shapes and any other shapes are also possible, wherein only correspondence with the shape and size of the port to be tested has to be ensured.

What is claimed:

1. A method for testing the seal of a glove which is installed in a particular port of an isolator, comprising:
providing a test disc having a seal for connecting to the port in a hermetically sealed fashion, the test disc having a pressure-measuring device, a microprocessor, a memory and a data interface for transmission of information, the test disc further including a reading device configured to determine an identity of the particular isolator port;
sealing an open end of a glove between the test disc and port so as to define an internal glove volume, the glove having a first identification element;
placing the glove volume under excess pressure;
measuring the glove volume pressure with the pressure-measuring device of the test disc;
recording and storing a glove volume pressure profile with the microprocessor and memory;
reading the first identification element of the glove with the reading device of the test disc to determine a glove identity; and storing both the identity of the glove and the identity of the particular isolator port in the memory.

2. The method of claim 1, further including measuring the glove volume pressure over a predefined time period and comparing any pressure drop with a limiting value.

3. The method of claim 1, further including correlating historical data on previous tests of the glove and estimating a residual period of use of the glove therefrom.

4. The method of claim 1, further including simultaneously receiving the pressure profiles for a plurality of gloves from a plurality of test discs, and assigning the respective pressure profiles to a corresponding glove and port.

5. The method of claim 1, further including preventing removal of the test disc from the port if a defect in the glove is detected.

6. The method of claim 1, further including recording an early pressure profile for a specific glove at a relatively early point in time and comparing the early pressure profile with a later pressure profile which is recorded for this glove at a relatively late point in time, and estimating a residual period of use of the glove from the comparison.

7. The method of claim 1, further including providing an evaluation unit comprising a memory unit and an output unit connected to a user database, and transmitting the pressure profile with the identities of a corresponding glove and port to the evaluation unit, and estimating a residual period of use of the glove therefrom.

8. The method of claim 7, wherein the transmission of the pressure profile with the identities of a corresponding glove and port to the evaluation unit are done wirelessly.

9. The method of claim 7, wherein process-related data about the use of the glove is stored in the evaluation unit and taken into account during the estimation.

10. The method of claim 1, further including providing an identification element for the port of the isolator which can be read by the reading device of the test disc.

\* \* \* \* \*